United States Patent [19]
Neil

[11] 3,733,160
[45] May 15, 1973

[54] MATERIAL HANDLING SYSTEM FOR PLASTIC FILM MOLDING APPARATUS

[75] Inventor: Peter C. Neil, Fullerton, Calif.

[73] Assignee: Standard Oil Company, Chicago, Ill.

[22] Filed: Mar. 18, 1971

[21] Appl. No.: 125,471

[52] U.S. Cl. ............... 425/217, 425/215, 425/301, 425/317, 425/140, 425/148
[51] Int. Cl. ................................................ B29c 29/00
[58] Field of Search ..................... 18/4 P, 4 S, 10, 18/DIG. 16, DIG. 46; 425/148, 317, 215, 217, 202, 140, 301

[56] References Cited
UNITED STATES PATENTS

| | | | |
|---|---|---|---|
| 3,192,293 | 6/1965 | Van Piper | 18/DIG. 46 |
| 3,026,566 | 3/1962 | Martelli et al. | 18/19 F |
| 3,150,213 | 9/1964 | Doering | 18/4 S X |
| 3,000,055 | 9/1961 | Schlechsupp | 18/DIG. 46 |
| 3,418,694 | 12/1968 | Strauss | 18/DIG. 46 |

Primary Examiner—Robert L. Spicer, Jr.
Attorney—Arthur G. Gilkes, William T. McClain and John J. Connors

[57] ABSTRACT

The system includes mixing apparatus, extruder, thermoformer, trimmer and grinder. Ground plastic from the mixing apparatus is fed directly to the extruder which provides a thin, continuous film of plastic. In the direct feed mode this film moves from the extruder directly into the thermoformer and then to the trimmer. Articles are formed in the film by the thermoformer and are cut from the film by the trimmer to leave a skeletal film which is fed directly into the grinder. In the bypass feed mode, film from the extruder or from the thermoformer is fed directly into the grinder. Novel mixing apparatus is disclosed for mixing plastics of different bulk densities, such as ground film from the thermoformer, extruder and trimmer. Also, novel cutting apparatus is disclosed which reduces noise and overloading problems.

7 Claims, 4 Drawing Figures

INVENTOR
PETER C NEIL
BY John J. Connors
ATTORNEY

MATERIAL HANDLING SYSTEM FOR PLASTIC FILM MOLDING APPARATUS

BACKGROUND

In manufacturing articles according to thermoforming techniques, a hot plastic film from an extruder is wound up on rolls. These rolls are then stored and later used as a feed to thermoforming equipment which forms in the film articles such as cups, lids, etc. The article(s) remains integral with excess or marginal film and a trimmer is used to cut the article from the film. The skeletal film remaining is then ground and reused. During start-up operations, adjustments must be made in the various processing equipment. Film from this equipment is accumulated and then periodically ground and reused. This waste material will have different bulk densities depending upon its source. For example, film from the trimmer section has a different bulk density than film from the extruder section. Conventionally, this reground material is mixed with virgin plastic and/or color concentrate and fed to an extruder. Mixing is usually done by volume. This leads to heterogeneous film weights which sometimes caused processing problems and non-uniformity in the quality of the articles being manufactured. Moreover, in the grinding of waste film, often the grinder is overloaded causing stalls or breakdown. There is also a great deal of noise associated with grinding operations which can be both annoying and harmful to workers in the vicinity.

THE INVENTION

I have now invented an improved material handling system for the various types of plastic film common to the thermoforming process. My system continually grinds film and recycles it to the extruder. It is operable in a direct feed mode or a bypass feed mode. In the direct feed mode, film from the extruder is in direct communication with the thermoformer, film from the thermoformer is in direct communication with the trimmer, and film from the trimmer is in direct communication with the grinder. In the bypass feed mode, film from the extruder or film from the thermoformer can be fed directly into the grinder. Ground plastic is recycled.

I have also invented apparatus for mixing plastics of different bulk densities with virgin plastic and/or color concentrate. According to this feature of my invention, plastics of different bulk densities or mixtures of such plastics and the virgin plastic and/or color concentrate are automatically weighed to provide a feed of uniform weight to an extruder.

I have also invented a novel cutting apparatus for the plastic film. This apparatus includes means which provide a signal corresponding to the speed of the plastic film. For example, a signal can be provided if the film deviates from a predetermined path if this would indicate a change in speed. This signal, electrically coupled to film feeding apparatus, controls the rate of the feeding of this film to insure that about the same amount of plastic is periodically ground. The cutting of the film may optionally be automatically controlled. Such improved cutting apparatus reduces labor and eliminates overloading of the grinder. Since the film is cut before being fed to the grinder, noise is reduced as is the likelihood of tearing of the film and thereby having to rethread the film.

DESCRIPTION OF PREFERRED EMBODIMENTS

In General

Figure 1:
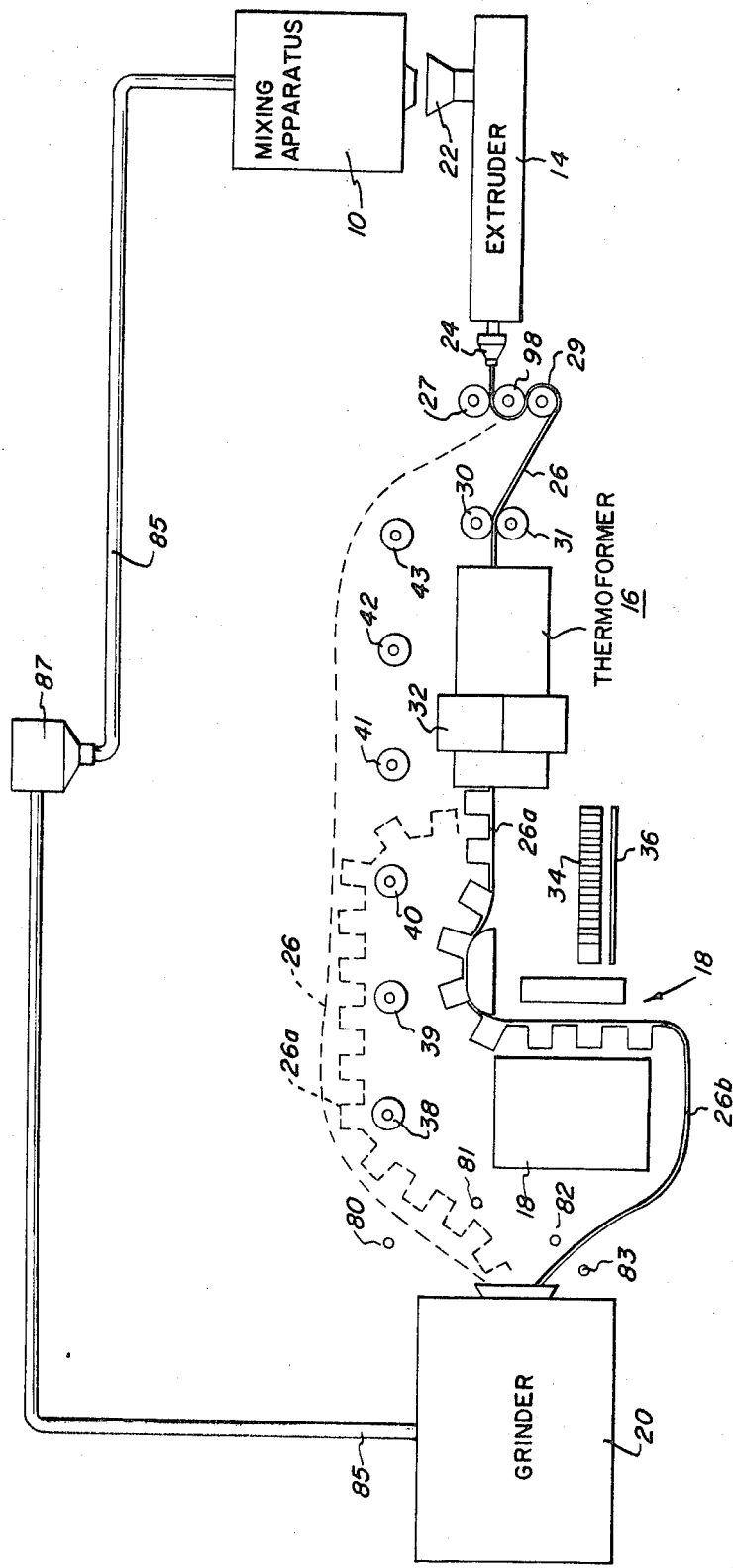
FIG. 1 is a schematic drawing showing my material handling system.
Figure 2:
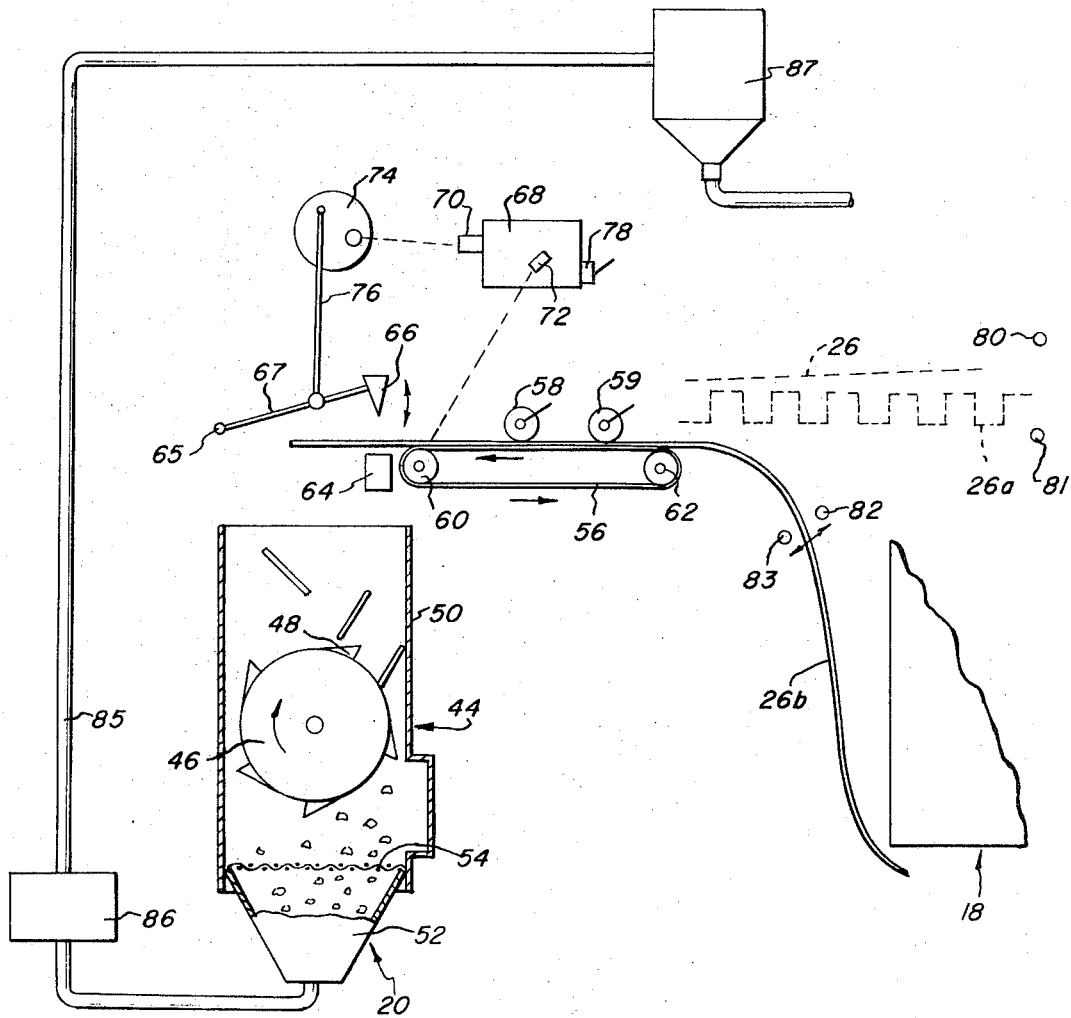
FIG. 2 is a schematic drawing showing my apparatus for cutting plastic.

As shown in FIG. 1, my material handling system for plastic film includes five principal components: mixing apparatus 10 including storage hopper 12 (FIG. 3); extruder 14; thermoformer 16; trimmer 18; and cutter 20 (FIG. 2).

Ground plastic from hopper 12 is fed into in-feed station 22 of extruder 14. The plastic is melted in extruder 14 and fed under pressure through flat film die 24. A thin, continuous film 26 leaves die 24, winds about polished rollers 27–29 and feeds into the nip of pull rollers 30 and 31. Pull rollers 30 and 31, moving at a slightly greater rpm (revolutions per minute) than polished rollers 27–29, feed film 26 directly into thermoformer 16. Means (not shown) within thermoformer 16 advance film 26 incrementally past thermoformer mold 32 in a stepwise fashion. The mold is initially separated as the film moves between the female and male members thereof. When the film stops momentarily, the male and female members of mold 32 come together and press the hot film of plastic between them to form an article(s) of manufacture such as cups, lids, etc. When the male and female members of the mold separate, a formed film 26a advances from thermoformer 16 directly to trimmer 18. This film 26a includes the article(s) of manufacture and excess or marginal film integral with the article(s) of manufacture. Trimmer 18, which may be conventional equipment, cuts out the article(s) of manufacture from film 26, leaving behind a skeletal film 26b of excess or marginal film. Article(s) of manufacture 34 are stacked on table 36 after being cut from film 26. Cutting apparatus 20 cuts skeletal film 26b into small pieces which are recycled to mixing apparatus 10.

My material handling system can be operated in either a direct feed mode or a bypass feed mode. In the direct feed mode, my system provides a cyclic system where there is direct feed of material from one piece of process equipment to the next, continuously. This provides economies in time, space and man power. In the bypass mode, films 26 and 26a can be moved along alternate paths, shown in dotted lines, as required. Film 26 from extruder 14 may bypass thermoformer 16 and trimmer 18 and be fed directly into grinder 20, or film 26a may bypass trimmer 18 and be fed directly into grinder 20. Rollers 38–43, inclusive, serve as the means for bypassing thermoformer 16 and trimmer 18. Rollers 38–40 serve as the means for bypassing trimmer 18. It is important to have these various alternate feed routes available, especially at start-up when it is necessary to make adjustments in the various equipment. Conventionally, at start-up or when making adjustments, the output from extruder 14 is merely collected and then periodically ground and recycled. My material handling system permits the output of extruder 14, even during start-up, to be recycled continually.

Cutting Apparatus

As shown in FIG. 2, my cutting apparatus 20 includes comminutor 44 comprising knives 48 attached to grinder drum 46 which is rotatably mounted within housing 50. The top end of housing 50 is open and at its lower end is a funnel section 52 with screen 54 for controlling the particle size of the ground plastic feeding into the funnel section. Above the open top of housing 50 is conveyor belt 56. A pair of weight rolls 58 and 59 rest on conveyor belt 56 and hold skeletal film 26b on conveyor belt 56 as this film 26b moves into cutting apparatus 20. Conveyor belt 56 loops about drive roll 60 and idler roll 62, and adjacent drive roll 60 is platen 64. Guillotine blade 66, pivotally mounted at 65 through linkage 67, moves toward and away from platen 64 to sever film 26b as the film advances between blade 66 and platen 64. The severed film falls into comminutor 44 where drum 46 grinds it into small pieces of plastic which pass through screen 54. A tube 85, including blower 86 and cyclone 87, recycles ground plastic to hopper 12 of mixing apparatus 10. Variable speed, stop-start motor 68, connected to drive roll 60, moves conveyor belt 56 in a stepwise fashion to advance film 26b incrementally. This motor 68 has two output shafts 70 and 72. Shaft 70 is connected to cam 74 which is in turn connected through rod 76 to blade linkage 67. Shaft 72 is connected to drive roll 60.

In the direct feed mode, when skeletal film 26b comes from trimmer 18, proximity sensors 82 and 83 control the operation of motor 68. In the bypass mode, with film 26 bypassing thermoformer 16 and trimmer 18, or film 26a bypassing trimmer 18, proximity sensors 80 and 81 control the speed of motor 68. Manually operated switch 78 switches control of motor 68 between the two pairs of sensors. The two pairs of sensors straddle the predetermined paths of the different films and detect any substantial deviation from these paths. This deviation indicates a change in the speed of the films. For example, film 26b is being advanced by feeding means (not shown) in the trimmer. However, the speed of film 26b may vary. If film 26b is advancing too rapidly, the film moves toward sensor 83 deviating from its normal path. Sensor 83 detects this deviation and provides a control signal which is transmitted to motor 68. Motor 68 responds to the control signal by increasing its speed. This returns film 26b to its normal path. If film 26b is advancing too slowly, the film again deviates from its normal path moving toward sensor 82. This also provides a control signal to motor 68 to signal the motor to decrease its speed. This decrease in the motor speed returns film 26b to its normal path. Sensors 80 and 81 operate in a similar fashion to detect deviation of film 26 or film 26a from its normal path and control the speed of motor 68 accordingly. This controlled film movement insures that the film will always move toward blade 66 at essentially the same incremental distance with each advance. This serves to minimize machine noise, avoid tearing of the film and overloading comminutor 44.

Mixing Apparatus

Ground plastic stored in hopper 12 is composed of ground extruder film 26, ground thermoformed film 26a, and ground skeletal film 26b. Each of these different plastics from different film sources has a different bulk density. My novel mixing apparatus mixes this ground plastic with virgin plastic and/or color concentrate, providing a film of uniform weight. This eliminates processing problems due to weight variations attributable to using plastics of different bulk densities.

Mixing apparatus 10, in addition to hopper 12, includes three bins 90–92. Bin 90 stores the color concentrate, bin 91 stores virgin plastic, and bin 92 stores ground plastic supplied from hopper 12 by auger 94. Beneath bin 92 is weigh scale 96 including conveyor belt 98 driven by constant speed motor 100, and load cell 102. Beneath bins 90 and 91 is conveyor belt 104 driven by variable speed motor 106. Each bin 90 and 91 includes a tube 90a and 91a, respectively, which can be lowered or raised by manually turning an associated control knob 90b and 91b respectively. The height of these tubes 90a and 91a relative to conveyor belt 104 and the speed of belt 104 control the amount of virgin plastic and/or color concentrate coming from bins 91 and 90.

Conveyor belt 98 moves ground plastic toward the left and conveyor belt 104 moves the virgin plastic and/or color concentrate toward the right. As the upper flights of these belts reach their terminal points, the materials carried by these belts fall into in-feed station 22 of extruder 14. Weigh scale 96 weighs the ground plastic on conveyor belt 98 and load cell 102 generates a control signal which is linearly proportional to the weight of the ground plastic on belt 98. Load cell 102 is electrically coupled to variable speed motor 106 and the control signal is thus transmitted to motor 106 to control the speed thereof. Thus motor 106 slows down or speeds up conveyor belt 104, and more or less virgin plastic and/or color concentrate is mixed with ground plastic. This maintains a constant weight of material being added to extruder 14. Because variations in bulk densities of the ground plastic are automatically compensated for, the quality of extruded film 26 is uniform. My novel mixer 10 also permits instant variation of the weight of extruded film 26.

Optionally, a bypass line 110 may be provided to bypass weigh scale 96. Also, hopper 12 may be equipped with a fill sensor 111 and an empty sensor 112 at the top and bottom of the hopper, respectively. Bin 92 can also be equipped with a fill sensor 113. These sensors provide audio or visual signals indicating the load condition of material in the hopper or bin. Fill sensor 111 can be electrically coupled to blower 86 so that the blower can shut off feed to hopper 12 if the hopper is in danger of overflowing.

Figure 3:
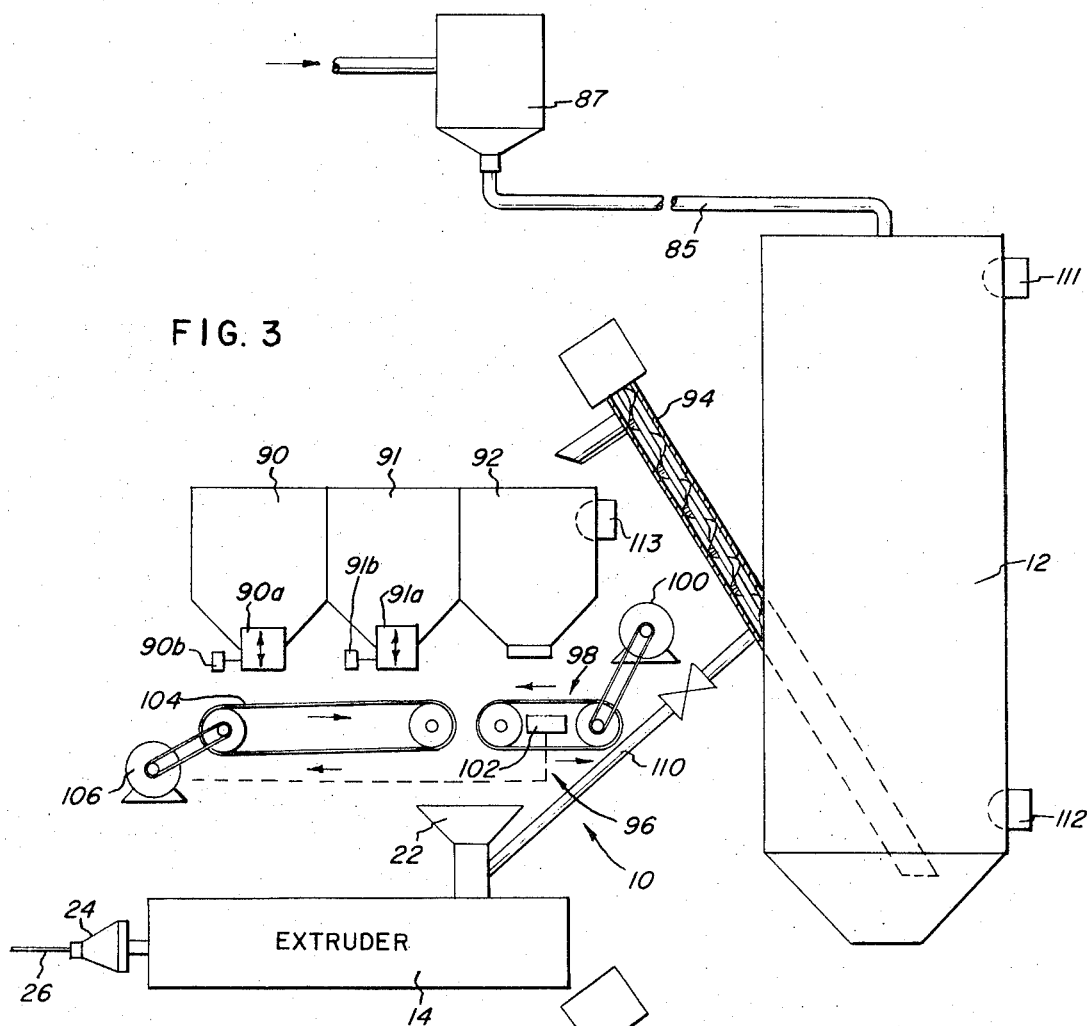
FIG. 3 is a schematic drawing showing my apparatus for mixing plastics of different bulk densities.
Figure 4:
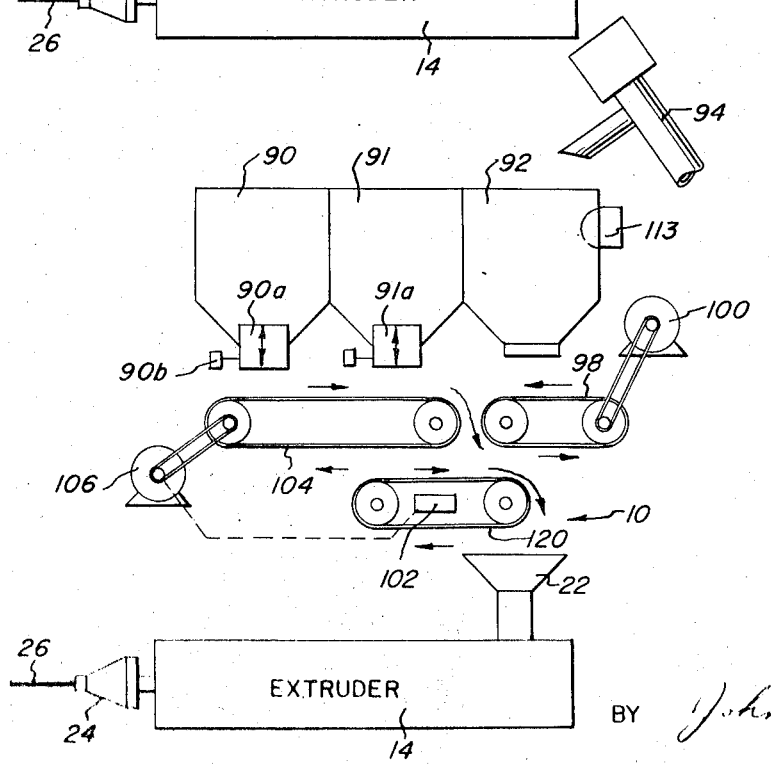
FIG. 4 is a schematic drawing showing an alternate embodiment of my apparatus for mixing plastics of different bulk densities.

FIG. 4 shows an alternate embodiment of the mixing apparatus. This apparatus is similar to that shown in FIG. 3, and like elements are designated by the same numerals. The principal difference between the apparatus shown in FIG. 4 and that shown in FIG. 3 is the use of a third conveyor belt 120 positioned below conveyor belts 98 and 104 at the point where the plastics of different bulk densities are mixed with the virgin plastic and/or color concentrate. Load cell 102 is associated with belt 120 and it weighs the mixture of plastics of different bulk densities and the virgin plastic and/or color concentrate. The load cell provides a signal in accordance with the weight of this mixture of plastics. The output of load cell 102 is connected to the input of variable speed motor 106 and the control signal varies the speed of motor 106 in accordance with the weight of plastic on conveyor belt 120. Motor 106 then either increases, decreases or maintains the same rate of speed of belt 104.

I claim:

1. In combination,
    storage means for holding plastic and including means for feeding stored plastic to extruder means,
    extruder means in direct communication with the storage means, said extruder means receiving stored plastic from the storage means and extruding it into a thin, continuous film,
    thermoformer means in direct communication with the extruder means, said thermoformer means receiving from the extruder means said film and forming therein an article or articles of manufacture,
    trimming means in direct communication with the thermoformer means, said trimming means receiving the film from the thermoformer means and trimming said film to cut away the article or articles of manufacture and leave thereafter a skeletal film,
    grinding means in direct communication with the trimming means, said grinding means receiving skeletal film from the trimming means and grinds it into small pieces of plastic,
    means for moving ground plastic from the grinding means to the storage means, and
    bypass means which permit the thin, continuous film of plastic coming from the extruder means to be transported directly to the grinding means, bypassing the thermoformer means and trimming means.

2. In combination,
    storage means for holding plastic and including means for feeding stored plastic to extruder means,
    extruder means in direct communication with the storage means, said extruder means receiving stored plastic from the storage means and extruding it into a thin, continuous film,
    thermoformer means in direct communication with the extruder means, said thermoformer means receiving from the extruder means said film and forming therein an article or articles of manufacture,
    trimming means in direct communication with the thermoformer means, said trimming means receiving the film from the thermoformer means and trimming said film to cut away the article or articles of manufacture and leave thereafter a skeletal film,
    grinding means in direct communication with the trimming means, said grinding means receiving the skeletal film from the trimming means and grinding it into small pieces of plastic,
    means for moving ground plastic from the grinding means to the storage means, and
    bypass means which permit the film including the article or articles of manufacture coming from the thermoformer means to be transported directly to the grinding means, bypassing the trimming means.

3. Apparatus comprising,
    extruder means which extrude plastic into a thin, continuous film,
    thermoformer means which receive said film from extruder means and form therein an article or articles of manufacture,
    trimming means which receive the film from the thermoformer means and trim said film to cut away the article or articles of manufacture and leave thereafter a skeletal film, and
    grinding means which receive the skeletal film from the trimmer means and grind it into small pieces of plastic,
    said apparatus characterized by being operable in either a direct feed mode or a bypass feed mode, wherein in the direct feed mode the film moves directly, sequentially and continuously from the extruder means, through the thermoformer means and trimming means to the grinding means, and in the bypass mode the film moves along two alternate paths where along the first path the film bypasses the thermoformer means and the trimming means and along the second path the film bypasses the trimming means.

4. The apparatus of claim 3 additionally including means for mixing plastics of different bulk densities with virgin plastic and/or color concentrate, comprising
    first storage means which hold the plastics of different bulk densities,
    weighing means in communication with the first storage means for receiving and weighing said plastics of different bulk densities, said weighing means including signal generating means which generate a control signal proportional to the weight of the plastic weighed by the weighing means,
    first moving means for moving the weighed plastics of different bulk densities to a mixing point where they are mixed with the virgin plastic and/or color concentrate,
    second storage means which hold the virgin plastic and/or color concentrate, and
    second moving means in communication with the second storage means for receiving the virgin plastic and/or color concentrate and moving it to the mixing point, said second moving means including drive means responsive to the control signal from the signal generating means to vary the rate at which said virgin plastic and/or color concentrate is moving in accordance with the weight of the plastics of different bulk densities.

5. The apparatus of claim 3 additionally including means for mixing plastics of different bulk densities with virgin plastic and/or color concentrate, comprising
    first storage means which hold the plastics of different bulk densities,
    second storage means which hold the virgin plastic and/or color concentrate,
    first moving means in communication with the first storage means for receiving the plastics of different bulk densities and moving said plastics to a mixing point,
    second moving means in communication with the second storage means for receiving the virgin plastic and/or color concentrate and moving said virgin plastic and/or color concentrate to said mixing point,
    weighing means at the mixing point for receiving and weighing the mixture of plastics, said weighing means including signal generating means which generate a control signal proportional to the weight of the mixture of plastics, and
    drive means for the second moving means which are responsive to said control signal from the signal generating means to vary the rate at which said virgin plastic and/or color concentrate is moved to said mixing point in accordance with the weight of the mixture of said plastics.

6. The apparatus of claim 3 additionally including means for cutting plastic film or the like, comprising cutter means for severing the plastic film into short lengths, conveyor means for moving the plastic film to the cutter means, means for moving plastic along a predetermined path to said conveyor means, signal generating means including sensor means along said path which provide a control signal corresponding to the rate of speed of the plastic film as it moves to said conveyor means, drive means for the conveyor means including a variable speed motor responsive to the control signal to vary the rate at which said conveyor means moves the plastic film to the cutter means in response to said control signal, and grinding means which receive the severed lengths of plastic and grind them into small pieces of plastic.

7. The apparatus of claim 3 wherein the grinding means comprises cutter means including a movable blade for severing the plastic into short lengths, conveyor means for moving the plastic film to the cutter means, means for moving plastic along a predetermined path to said conveyor means, signal generating means including sensor means along said path which provide a control signal whenever the plastic film deviates substantially from said path, common drive means for the blade and the conveyor means including a variable speed motor responsive to the control signal to vary the movement of the blade and the rate at which the plastic film is conveyed to the cutter means in response to said control signal, and means which receive the severed lengths of plastic and grind them into small pieces of plastic.

* * * * *